US012801112B2

(12) United States Patent
Kamo

(10) Patent No.: US 12,801,112 B2
(45) Date of Patent: Nov. 17, 2026

(54) MACHINE TOOL AND MOVING POSITION DETERMINING METHOD

(71) Applicant: STAR MICRONICS CO., LTD., Shizuoka (JP)

(72) Inventor: Shotaro Kamo, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 419 days.

(21) Appl. No.: 18/631,468

(22) Filed: Apr. 10, 2024

(65) Prior Publication Data

US 2024/0342805 A1 Oct. 17, 2024

(30) Foreign Application Priority Data

Apr. 13, 2023 (JP) ................................. 2023-065366

(51) Int. Cl.
*G05B 19/19* (2006.01)

(52) U.S. Cl.
CPC .................................... *G05B 19/19* (2013.01)

(58) Field of Classification Search
CPC . G05B 2219/50201; B23B 25/06; B23B 5/18; B23B 5/12; B23Q 15/013; B23Q 15/12; B23Q 17/2233; B23Q 2017/001
See application file for complete search history.

(56) References Cited

U.S. PATENT DOCUMENTS 10,272,493 B2 * 4/2019 Krebs ..................... B22F 10/12
2007/0295175 A1 * 12/2007 Akiyama .................. B23B 5/48 82/117
2012/0196510 A1 * 8/2012 Franklin ................. B24B 19/26 451/5

(Continued)

FOREIGN PATENT DOCUMENTS

CN 207908340 U 9/2018
EP 4163744 A1 * 4/2023 ............ B23Q 15/12

(Continued)

OTHER PUBLICATIONS

Zhang et al., Influences of shim stiffness on the vibration response of tool-shim system and the impact fracture resistance of cutting tool in intermittent cutting, The International Journal of Advanced Manufacturing Technology (2022) 123:571-589, https://doi.org/10.1007/s00170-022-10183-6.

*Primary Examiner* — Santosh R Poudel

(74) *Attorney, Agent, or Firm* — MUNCY, GEISSLER, OLDS & LOWE, P.C.

(57) ABSTRACT

A technology capable of improving the accuracy of true-circular machining while avoiding an occurrence of intermittent cutting. A control unit of a machine tool determines an intermediate center position (Pi) in the moving direction for each divided rotation angle (E) smaller than a single rotation of the spindle and an intermediate eccentric radius (ri) around the intermediate center position (Pi) according to an initial position (Po) of the cutting edge in contact with the workpiece in the moving direction, the eccentric center position (Pc), and the eccentric radius (rc) to keep the cutting edge in contact with the workpiece as the moving object moves in the moving direction within a predetermined maximum feed speed (F) until a true-circular machining around the eccentric center position (Pc) is complete on the workpiece.

6 Claims, 11 Drawing Sheets

(56) References Cited

U.S. PATENT DOCUMENTS

| | | | | |
|---|---|---|---|---|
| 2014/0202294 | A1* | 7/2014 | Takahashi | B23B 25/00<br>82/1.11 |
| 2015/0309501 | A1* | 10/2015 | Ikegaya | G05B 19/4061<br>700/186 |
| 2018/0369920 | A1* | 12/2018 | Takahashi | B23B 5/36 |

FOREIGN PATENT DOCUMENTS

| | | | |
|---|---|---|---|
| JP | H10151501 | A | 6/1998 |
| JP | H11277303 | A | 10/1999 |

* cited by examiner

MACHINE TOOL AND MOVING POSITION DETERMINING METHOD

CROSS-REFERENCES

This application claims priority of Japanese Patent Application No. 2023-065366 filed on Apr. 13, 2023. The contents of this application are incorporated herein by reference in their entirety.

BACKGROUND

(a) Field

The present invention relates to a machine tool capable of performing a true-circular machining eccentric from a spindle axis and a moving position determining method.

(b) Description of the Related Art

An NC (numerical control) lathe provided with a spindle and a tool post is well known as the machine tool. A tool is attached to the tool post. The tool has a cutting edge cutting a workpiece. The NC lathe cuts the workpiece gripped by the spindle with the tool attached to the tool post.

A lathe disclosed in Japanese Unexamined Patent Application Publications No. H10-151501 synchronizes a crank motion of a tool post support with a spindle rotation in a plane facing the spindle with a crank shaft whose eccentric amount equal to that of an eccentric axis and then performs an eccentric axis machining with a cutting tool that circularly moves by the eccentric amount in a Z-axis cutting feed of the tool post.

SUMMARY OF THE INVENTION

In a true-circular machining eccentric from a spindle axis on a rotating workpiece, if part of a circumferential cutting edge path around an eccentric center position on an X-Y plane perpendicular to the spindle axis is outside the workpiece, the cutting edge repeats separation and contact with the workpiece as the spindle rotates. Such intermittent cutting increases a risk of damage to the tool. Avoiding intermittent cutting and improving the accuracy of the true-circular machining is desired. The problem resides in a various machine tools including a machining center.

The invention discloses a technology capable of improving the accuracy of the true-circular eccentric machining accuracy while avoiding intermittent cutting.

A machine tool of the invention includes:

a spindle rotating around a spindle axis along with a workpiece;

a tool post to which a tool is attached, the tool having a cutting edge cutting the workpiece; and a control unit configured to move at least one moving object in a moving direction perpendicular to the spindle axis to perform a true-circular machining of an eccentric radius (rc) around an eccentric center position (Pc) in the moving direction as the spindle rotates, the moving object including the spindle and the tool post;

wherein the control unit determines an intermediate center position (Pi) in the moving direction for each divided rotation angle (E) smaller than a single rotation of the spindle and an intermediate eccentric radius (ri) around the intermediate center position (Pi) according to an initial position (Po) of the cutting edge in contact with the workpiece in the moving direction, the eccentric center position (Pc), and the eccentric radius (rc) to keep the cutting edge in contact with the workpiece as the moving object moves in the moving direction within a predetermined maximum feed speed (F) until the true-circular machining around the eccentric center position (Pc) is complete on the workpiece, and the control unit moves the moving object in the moving direction as the spindle rotates to perform a cutting of the intermediate eccentric radius (ri) around the intermediate eccentric center position (Pi) for said each divided rotation angle (E) on the workpiece.

A moving position determining method of the invention includes:

a moving position determining method for a machine tool provided with a spindle rotating around a spindle axis along with a workpiece and a tool post to which a tool having a cutting edge cutting the workpiece is attached, the method moving at least one moving object including the spindle and the tool post in a moving direction perpendicular to the spindle axis to perform a true-circular machining of an eccentric radius (rc) around an eccentric center position (Pc) in the moving direction as the spindle rotates, the method comprising:

a first step determining an intermediate center position (Pi) in the moving direction for each divided rotation angle (E) smaller than a single rotation of the spindle and an intermediate eccentric radius (ri) around the intermediate center position (Pi) according to an initial position (Po) of the cutting edge in contact with the workpiece in the moving direction, the eccentric center position (Pc), and the eccentric radius (rc) to keep the cutting edge in contact with the workpiece as the moving object moves in the moving direction within a predetermined maximum feed speed (F) until the true-circular machining around the eccentric center position (Pc) is complete on the workpiece, and a second step determining the moving position of the moving object in the moving direction as the spindle rotates to perform a cutting of the intermediate eccentric radius (ri) around the intermediate eccentric center position (Pi) for said each divided rotation angle (E) on the workpiece.

The invention provides a technology capable of improving the accuracy of the true-circular eccentric machining accuracy while avoiding intermittent cutting.

DETAILED DESCRIPTION

Hereinafter, an embodiment of the present invention will be described. The embodiment is only an example of the invention. The features disclosed in the embodiments may not necessarily all be required to solve the problem.

(1) SUMMARY OF TECHNOLOGY OF THE INVENTION

Technology of the invention is being summarized referring FIG. 1 to FIG. 11. The drawings only schematically show examples of the invention. The magnification may be different and the drawings may not match to each other. Any element of the technology may not be limited to the specific element denoted by a symbol.

Embodiment 1

Figure 1:
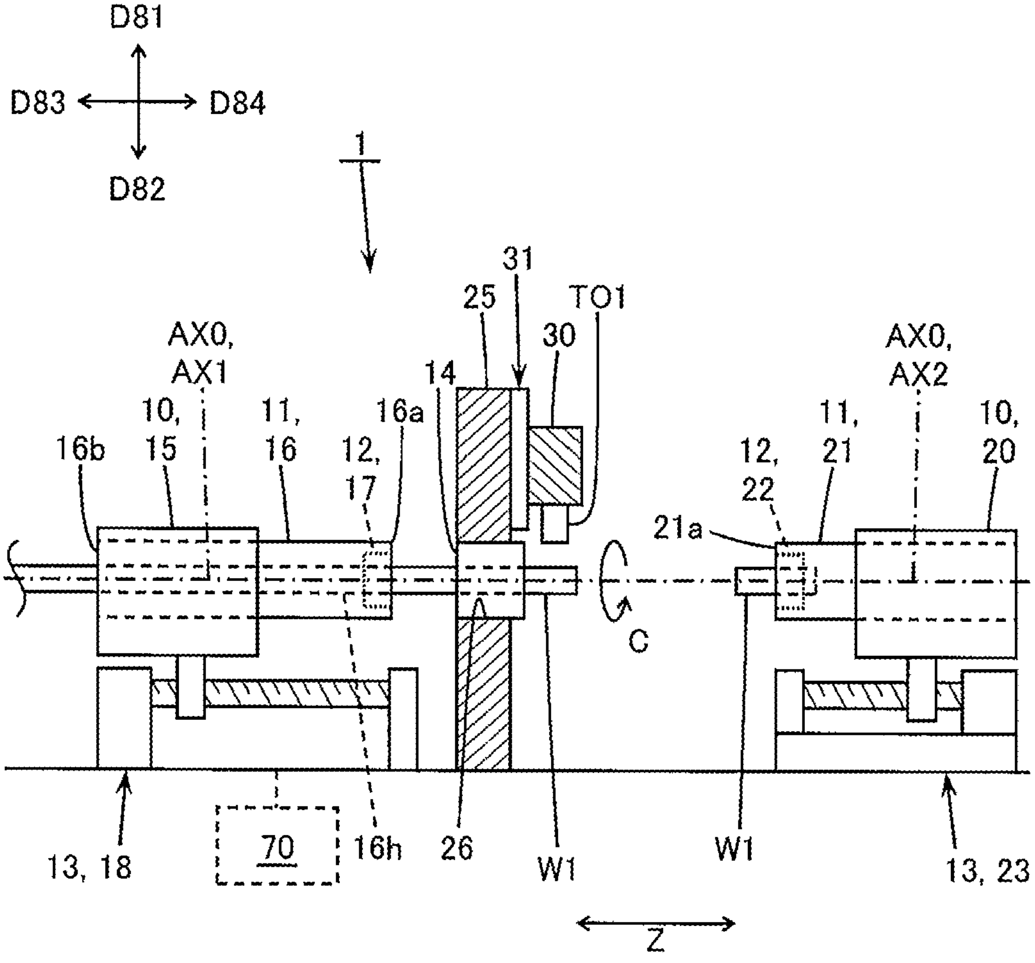
FIG. 1 is a front view schematically showing a configuration of a machine tool.
Figure 2:
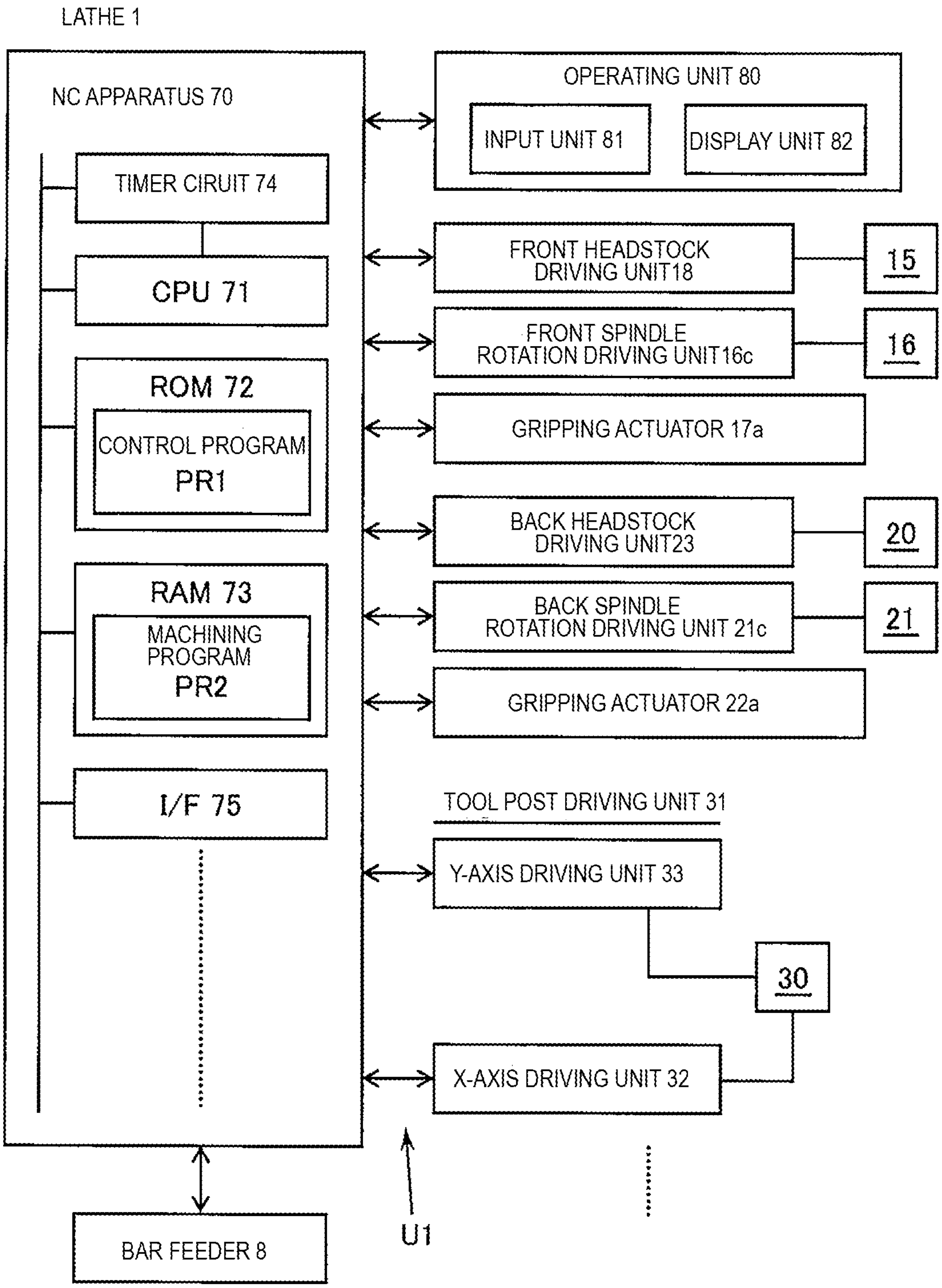
FIG. 2 is a block diagram schematically showing an electrical configuration of the machine tool.

As shown in FIG. 1 and FIG. 2, the machine tool (a lathe 1) of an embodiment of the invention includes a spindle 11, a tool post 30, and a control unit U1. The spindle 11 rotates around a spindle axis AX0 along with a workpiece W1. A tool TO1 is attached the tool post 30. The tool TO1 has a cutting edge TOt cutting the workpiece W1. The control unit U1 moves at least one moving object in a moving direction D1 perpendicular to the spindle axis AX0 to perform a true-circular machining of an eccentric radius (rc) around an eccentric center position (Pc) in the moving direction D1 as the spindle 11 rotates. The moving object includes the spindle 11 and the tool post 30. The control unit U1 determines an intermediate center position (Pi) in the moving direction D1 for each divided rotation angle (E) smaller than a single rotation of the spindle 11 and an intermediate eccentric radius (ri) around the intermediate center position (Pi) according to an initial position (Po) of the cutting edge TOt in contact with the workpiece W1 in the moving direction D1, the eccentric center position (Pc), and the eccentric radius (rc) to keep the cutting edge TOt in contact with the workpiece W1 as the moving object moves in the moving direction D1 within a predetermined maximum feed speed (F) until the true-circular machining around the eccentric center position (Pc) is complete on the workpiece W1. The control unit U1 moves the moving object in the moving direction D1 as the spindle 11 rotates to perform a cutting of the intermediate eccentric radius (ri) around the intermediate eccentric center position (Pi) for each divided rotation angle (E) on the workpiece W1.

In true-circular machining eccentric from the spindle axis AX0, keeping the cutting edge TOt in contact with the workpiece W1 can avoid an occurrence of intermittent cutting. Performing the cutting of the intermediate eccentric radius (ri) around the intermediate eccentric center position (Pi) determined for each divided rotation angle (E) on the workpiece W1 can suppress an occurrence of a step on the true-circular shape which is likely formed at a phase that the eccentric radius varies for each single rotation of the spindle. The embodiment can provide the machine tool capable of improving the accuracy of true-circular eccentric machining while avoiding an occurrence of intermittent cutting.

The control unit may move only the tool post in the moving direction. The control unit may move only the spindle in the moving direction. The control unit may move both of the spindle and the tool post in the moving direction. The movement of at least one of the spindle and the tool post may include a movement that the cutting edge moves toward the eccentric center position (Pc) and a movement that the cutting edge separates from the eccentric center position (Pc). The cutting edge having a rake angle can cut the workpiece even in the movement separating from the eccentric center position (Pc). The embodiment includes a true-circular eccentric machining when the cutting edge separates from the eccentric center position (Pc). The remarks described above may be applied to the following embodiments.

Embodiment 2

Figure 5:
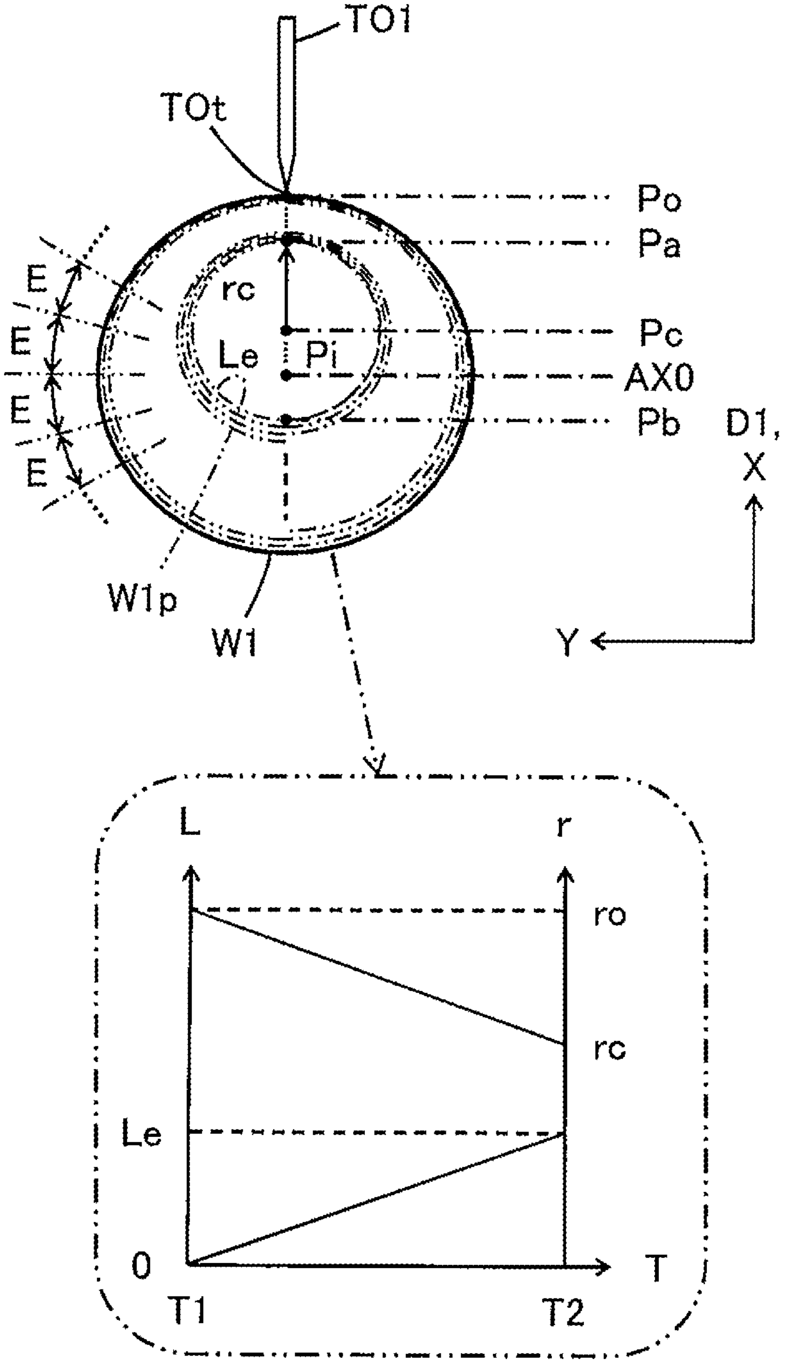
FIG. 5 schematically shows a cutting edge path whose intermediate eccentric center position (Pi) varies.
Figure 6:
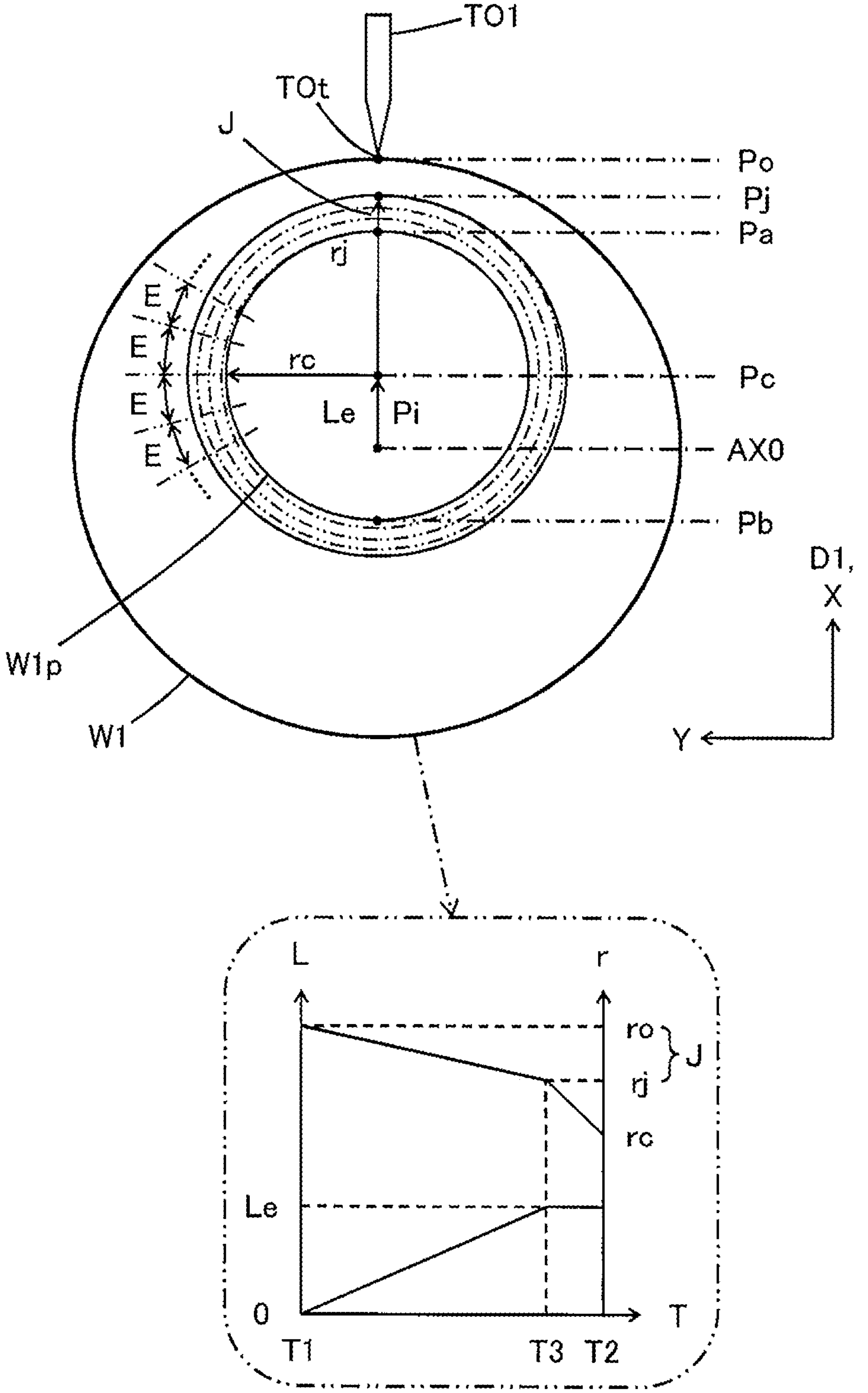
FIG. 6 schematically shows a cutting edge path around an eccentric center position (Pc) in a final machining allowance.
Figure 7:
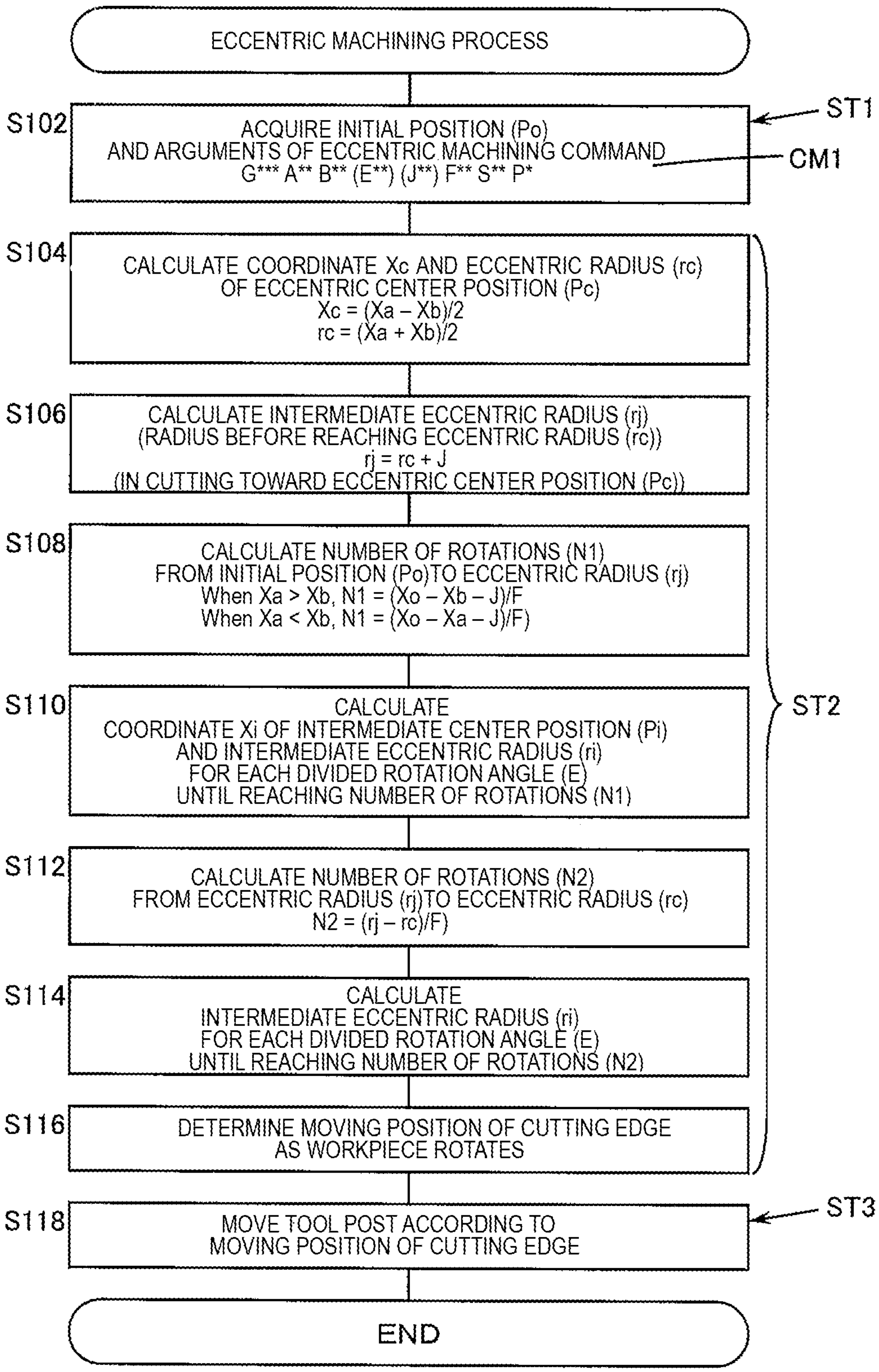
FIG. 7 is a flowchart schematically showing an eccentric machining process.

As shown in FIG. 5 to FIG. 7, the control unit U1 may move the moving object in the moving direction D1 to perform the cutting of the intermediate eccentric radius (ri) around the intermediate eccentric center position (Pi) for each divided rotation angle (E) on the workpiece W1 until the true-circular machining of an intermediate eccentric radius (rj) around the eccentric center position (Pc) is complete on the workpiece W1. The intermediate eccentric radius (rj) is on the way from the initial position (Po) to the eccentric radius (rc) to keep the cutting edge TOt in contact with the workpiece W1. The control unit U1 may move the moving object in the moving direction D1 within the maximum feed speed (F) to perform the true-circular machining of the eccentric radius (rc) around the eccentric center position (Pc) on the workpiece W1 with the eccentric radius (rj) as a start point.

The embodiment makes the machining allowances constant regardless of the spindle phases from the intermediate eccentric radius (rj) to the final eccentric radius (rc), which can improve the circularity of eccentric machining. Though not included in this embodiment, the inventive technology includes a cutting of the intermediate eccentric radius (ri) around the intermediate eccentric center position (Pi) for each divided rotation angle (E) on the workpiece W1 until the true-circular machining of the final eccentric radius (rc) around the eccentric center position (Pc) is complete on the workpiece W1.

Embodiment 3

Figure 8:
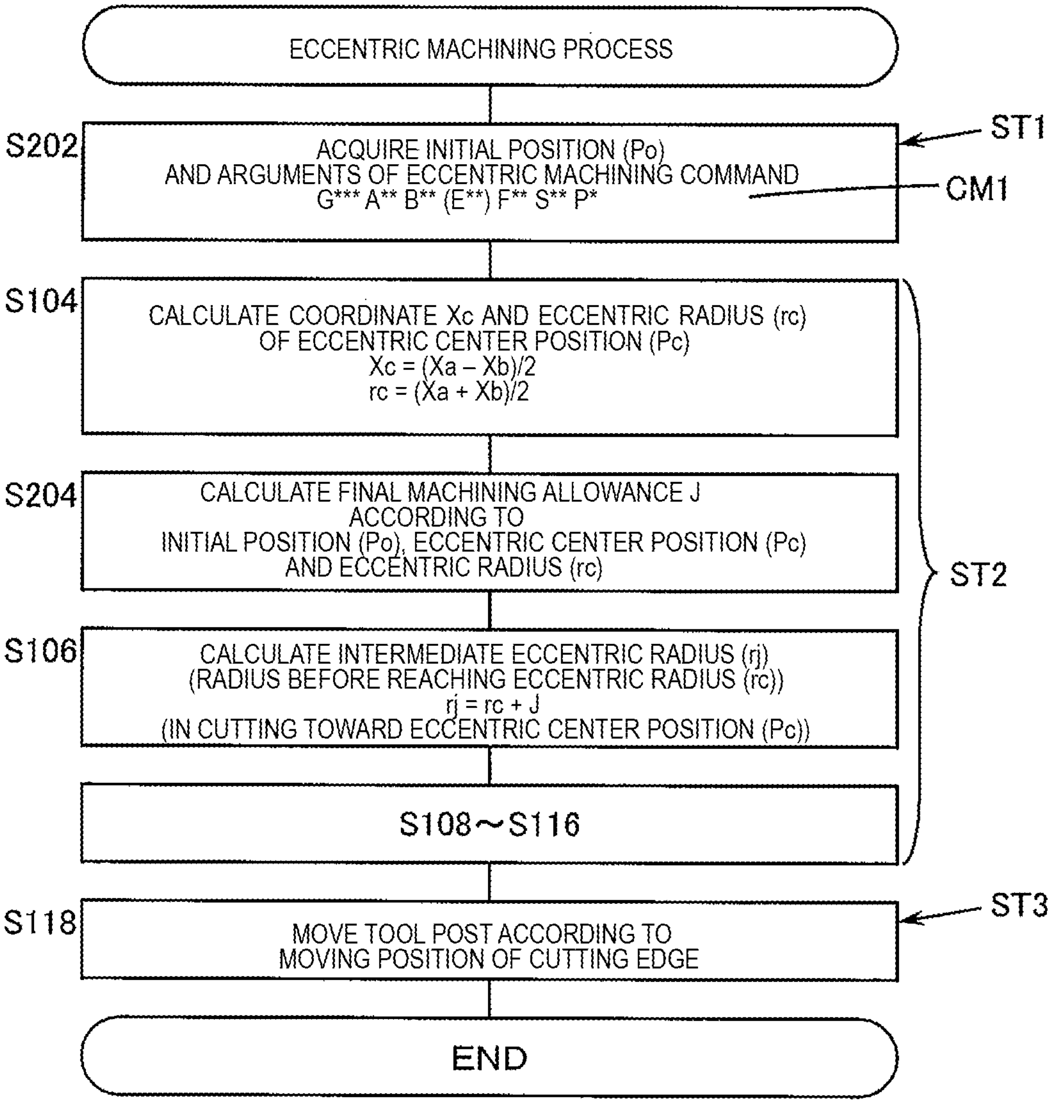
FIG. 8 is a flowchart schematically showing an eccentric machining process including a final allowance determining process.

As shown in FIG. 8, the control unit U1 may determine the eccentric radius (rj) around the eccentric center position (Pc) according to the initial position (Po), the eccentric center position (Pc), and the eccentric radius (rc). The embodiment eliminates the need of setting the intermediate eccentric radius (rj), thus improving a convenience for the operator.

Embodiment 4

As shown in FIG. 7, the control unit U1 may receive a command including a coordinate of a first machining end point (Pa) on the eccentric radius (rc) at an initial phase of the workpiece W1 around the spindle axis AX0, a coordinate of a second machining end point (Pb) on the eccentric radius (rc) at a reverse phase different from the initial phase by 180 degrees, and the maximum feed speed (F). The control unit U1 may calculate a number of rotations (N1) of the spindle 11 required to complete the true-circular machining around the eccentric center position (Pc) on the workpiece W1 according to the initial position (Po), the coordinate of the first machining end point (Pa), the coordinate of the second machining end point (Pb), and the maximum feed speed (F). The eccentric center position (Pc) may be a middle point between the first machining end point (Pa) and the second machining end point (Pb). The control unit may determine the eccentric center position (Pi) and the eccentric radius (ri) for each divided rotation angle (E) at the phase of the workpiece W1 around the spindle axis AX0 according to the initial position (Po), the eccentric center position (Pc), the eccentric radius (rc), and the number of rotations (N1). The eccentric radius (rc) may be half a distance between the first machining end point (Pa) and the second machining end point (Pb).

The embodiment can provide the machine tool capable of receiving a command for executing the true-circular machining with accuracy while avoiding an occurrence of intermittent cutting. The eccentric center position (Pc) and the eccentric radius (rc) is obtained from the first machining end point (Pa) and the second machining end point (Pb). Then the intermediate eccentric center position (Pi) and the intermediate eccentric radius (ri) can be determined by the initial position (Po), the eccentric center position (Pc) and the eccentric radius (rc). The embodiment 4 is covered within the embodiment 1.

The words "first" and "second" herein only identify each of similar elements and mean no order. This remark is applied to the following embodiments.

Embodiment 5

A moving position determining method for the machine tool 1 provided with the spindle 11 rotating around the spindle axis AX0 along with the workpiece W1 and the tool post 30 to which the tool TO1 having the cutting edge TOt cutting the workpiece W1 is attached may move at least one moving object including the spindle 11 and the tool post 30 in the moving direction D1 perpendicular to the spindle axis AX0 to perform the true-circular machining of the eccentric radius (rc) around the eccentric center position (Pc) in the moving direction D1 as the spindle 11 rotates. The method may include the following steps (A1) and (A2) as shown in FIG. 7 and FIG. 8:

(A1) A first step ST1 determining the intermediate center position (Pi) in the moving direction D1 for each divided rotation angle (E) smaller than a single rotation of the spindle 11 and the intermediate eccentric radius (ri) around the intermediate center position (Pi) according to the initial position (Po) of the cutting edge TOt in contact with the workpiece W1 in the moving direction D1, the eccentric center position (Pc), and the eccentric radius (rc) to keep the cutting edge TOt in contact with the workpiece W1 as the moving object moves in the moving direction D1 within the predetermined maximum feed speed (F) until the true-circular machining around the eccentric center position (Pc) is complete on the workpiece W1.

(A2) A second step ST2 determining the moving position of the moving object in the moving direction D1 as the spindle 11 rotates to perform a cutting of the intermediate eccentric radius (ri) around the intermediate eccentric center position (Pi) for each divided rotation angle (E) on the workpiece W1.

The embodiment can provide the moving position determining method capable of improving the accuracy of true-circular eccentric machining while avoiding an occurrence of intermittent cutting.

(2) MACHINE TOOL CONFIGURATION

Figure 3:
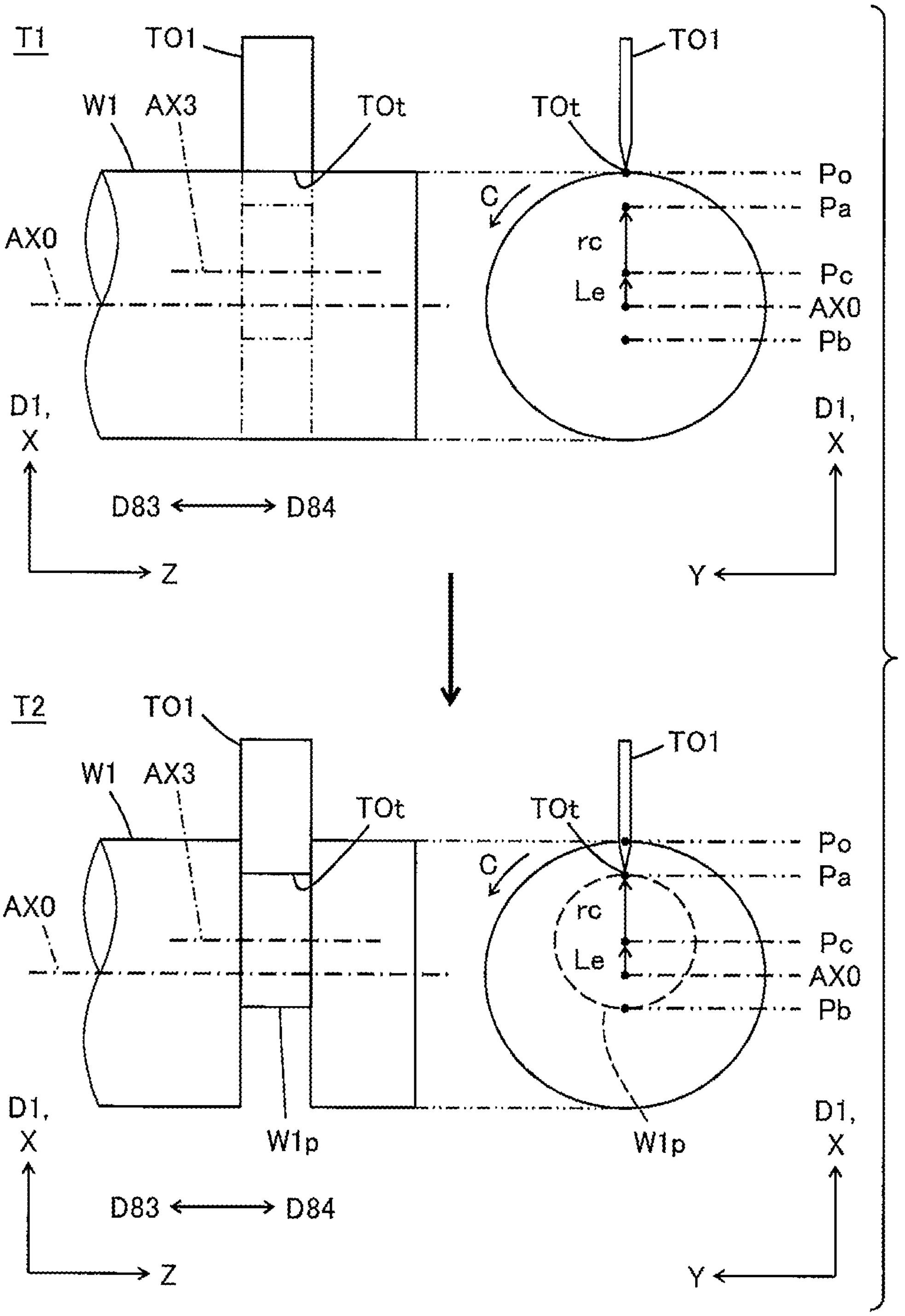
FIG. 3 schematically shows a true-circular machining eccentric from a spindle axis.

FIG. 1 is a front view schematically showing a configuration of the lathe 1 as an example of the machine tool. FIG. 2 is a block diagram schematically showing an electrical configuration of the lathe 1. FIG. 3 schematically shows the true-circular machining eccentric from the spindle axis AX0. The upper drawing shows the workpiece W1 and the tool TO1 at a start timing T1 when the cutting edge TOt of the tool TO1 is in the initial position (Po). The lower drawing shows the workpiece W1 and the tool TO1 at an end timing T2 when a true-circular eccentric part W1*p* around an eccentric axis AX3 deviated from the spindle axis AX0 is complete. FIG. 3 also shows the workpiece W1 as seen from the right side. FIG. 1 shows the upper direction D81, the lower direction D82, the left direction D83, and the right direction D84, which represent the directions seeing the lathe 1 in FIG. 1. As shown in FIG. 1 and FIG. 3, the control axis may include an X-axis shown by "X", a Y-axis shown by "Y", a Z-axis shown by "Z", and a C-axis shown by "C". The Z-axis direction is a horizontal direction along the spindle axis AX0, which is a rotation center of the workpiece W1. The X-axis direction is perpendicular to the Z-axis and may be the up-down direction (D81-D82) or the right and left direction (D83-D84). The Y-axis direction may be perpendicular to both of the Z-axis and the X-axis. The C-axis is a rotation axis around the spindle axis AX0. Any drawing referred herein shows an example only for explanation of the invention, therefore never limiting the scope of the invention. Any positional description is only an example. The invention includes reverse directions and reverse rotations. The same direction covers exactly the same direction and almost the same direction allowing for a margin of error. The same position covers exactly the same position and almost the same position allowing for a margin of error.

The lathe 1 may be an NC lathe including a headstock 10 provided with the spindle 11 having a gripping unit 12, a headstock driving unit 13, a supporting bed 25 having a mounting hole 26 for a guide bush 14, the tool post 30, a tool post driving unit 31, and an NC apparatus 70. The headstock 10 collectively refers to a front headstock 15 and a back headstock 20, which may be called an opposite headstock. The front headstock 15 incorporates a front spindle 16 having a gripping unit 17 such as a collet. The back headstock 20 incorporates a back spindle 21 having a gripping unit 22 such as a collet. The spindle 11 collectively refers to the front spindle 16 and the back spindle 21, which may be called an opposite spindle. The gripping unit 12 collectively refers to the gripping unit 17 and the gripping unit 22. The headstock driving unit 13 collectively refers to a front headstock driving unit 18 and a back headstock driving unit 23. The front headstock driving unit 18 moves the front headstock 15 along the Z-axis. The back headstock driving unit 23 moves the back headstock 20 at least along the Z-axis. The lathe 1 may be of spindle sliding type whose front spindle 16 moves in the Z-axis direction.

The front spindle 16 releasably grips the workpiece W1 with the gripping unit 17. The workpiece W is inserted from rear by a bar feeder 8 (FIG. 2). The front spindle 16 gripping the workpiece W1 may be rotatable around a spindle axis AX1. A front end 16*a* of the front spindle 16 faces the back spindle 21 while a rear end 16*b* of the front spindle 16 faces the bar feeder 8. The front spindle 16 has a through-hole 16*h* extended along the spindle axis AX1 into which the workpiece W1 inserted from rear. When the workpiece W1 is short, the short bar may be supplied to the gripping unit 17 from the front end 16*a* of the front spindle 16. The NC apparatus 70 drives a front spindle rotation driving unit 16*c* (FIG. 2) to rotate the front spindle 16 around the spindle axis AX1. The NC apparatus 70 drives a gripping actuator 17*a* (FIG. 2) to control the operation of the gripping unit 17. The gripping unit 17 may be a collet. The front headstock driving unit 18 drives the front headstock 15 in the Z-axis direction in response to a command from the NC apparatus 70. The workpiece W1 gripped by the front spindle 16 thereby moves in the Z-axis direction. The workpiece W1 may be a solid material such as a long columnar bar and a hollow material such as a long cylindrical bar.

A front end 21*a* of the back spindle 21 faces the front end 16*a* of the front spindle 16. The back spindle 21 releasably grips the half-finished workpiece W1 with the gripping unit 22 when the workpiece W1 is protruded forward from the front end 16*a* of the front spindle 16. The back spindle 21 gripping the workpiece W1 may be rotatable around a spindle axis AX2. The NC apparatus 70 drives a back spindle rotation driving unit 21*c* (FIG. 2) to rotate the back spindle 21 around the spindle axis AX2. The NC apparatus 70 drives a gripping actuator 22*a* (FIG. 2) to control the operation of the gripping unit 22. The gripping unit 22 may be a collet. The back headstock driving unit 23 drives the back headstock 20 in the Z-axis direction and further in the X-axis direction or the Y-axis direction in response to a command from the NC apparatus 70. When the workpiece W1 is gripped by both of the front spindle 16 and the back spindle 21, the spindle axis AX2 is kept aligned with the spindle axis AX1. The spindle axis AX0 collectively refers to the spindle axis AX1 and the spindle axis AX2. The forward direction of the front spindle 16 is a direction that the workpiece W1 is pushed out from the front spindle 16, which is the right direction D84 in FIG. 1. The forward direction of the back spindle 21 is a direction that the back spindle 21 moves toward the front spindle 16, which is the left direction D83 in FIG. 1.

The supporting bed 25 is disposed between the front headstock 15 and the back headstock 20 in the Z-axis direction. The supporting bed 25 is provided with the mounting hole 26 penetrated in the Z-axis direction. The guide bush 14 is inserted into the mounting hole 26 to be removably mounted on the supporting bed 25. The guide bush 14 supports the workpiece W1 protruded from the through-hole 16*h* of the front spindle 16 to allow the workpiece W1 to slide in the Z-axis direction. Part of the workpiece W1 protruded from the guide bush 14 toward the back spindle 21 (the right direction D84) is cut with the tool TO1. When the guide bush is not used, the front part of the front spindle 16 is inserted into the mounting hole 16. Part of the workpiece W1 protruded from the front spindle 16 in the forward direction (the right direction D84) is cut with the tool TO1.

A plurality of the tools TO1 is attached to the tool post 30 to cut the workpiece W1 gripped by at least one of the front spindle 16 and the back spindle 21. The tool TO1 has a cutting edge TOt to cut the workpiece W1. The plurality of the tools TO1 may include a cutting tool including a cut-off tool and a rotary tool such as a drill and an endmill. The NC apparatus 70 controls the operation to form the true-circular eccentric part W1*p* on the workpiece W1 with the cutting tool TO1 as described below. The tool post 30 may be a gang type tool post or a turret tool post. As shown in FIG. 2, The tool post driving unit 31 includes an X-axis driving unit 32 and a Y-axis driving unit 33. The X-axis driving unit 32 drives the tool post 30 along the X-axis in response to a command from the NC apparatus 70. The Y-axis driving unit 33 drives the tool post 30 along the Y-axis in response to a command from the NC apparatus 70. The tool TO1 attached to the tool post 30 moves on an X-Y plane, which is a plane formed along the X-axis and the Y-axis. The front side of the workpiece W1 gripped by the front spindle 16 is cut with the tool TO1. Then, the half-finished workpiece W1 gripped by both of the front spindle 16 and the back spindle 21 is cut off with the cut-off tool. Then, the back side of the cut-off workpiece W1 gripped by the back spindle 21 is cut with the tool TO1. The finished cut-off workpiece W1 is a product to be discharged. Though not shown, the lathe 1 may be provided with another tool post for back machining use.

As shown in FIG. 2, the NC apparatus 70 is connected to the bar feeder 8, the operating unit 80, the front headstock driving unit 18, the front spindle rotation driving unit 16*c*, the gripping actuator 17*a*, the back headstock driving unit 23, the back spindle rotation driving unit 21*c*, the gripping actuator 22*a*, the X-axis driving unit 32, and the Y-axis driving unit 33. The front headstock driving unit 18, the back headstock driving unit 23, the X-axis driving unit 32, and the Y-axis driving unit 33 are respectively provided with not-shown servo motors and not-shown servo amplifiers to vary the relative positions of the spindle 11 and the tool post 30 in response to a command from the NC apparatus 70. The front spindle rotation driving unit 16*c* and the back spindle rotation driving unit 21*c* are respectively provided with not-shown servo motors (such as built-in motors) and not-shown servo amplifiers to rotate the spindle 11 around the spindle axis AX0 in response to a command from the NC apparatus 70. The NC apparatus 70 can control the C-axis angle θ (FIG. 4), which is the rotation angle of the workpiece W1, by sending a command to the front spindle rotation driving unit 16*c* and the back spindle rotation driving unit 21*c*. The gripping actuator 17*a* drives the gripping unit 17 of the front spindle 16. The gripping actuator 22*a* drives the gripping unit 22 of the back spindle 21. The NC apparatus 70 may include a processor or a CPU (Central Processing Unit) 71, a semiconductor memory or a ROM (Read Only Memory) 72, a semiconductor memory or a RAM (Random Access Memory) 73, a timer circuit 74, and an I/F (interface) 75. The I/F 75 in FIG. 2 collectively represents interfaces of the bar feeder 8, the operating unit 80, the front headstock driving unit 18, the front spindle rotation driving unit 16*c*, the gripping actuator 17*a*, the back headstock driving unit 23, the back spindle rotation driving unit 21*c*, the gripping actuator 22*a*, the X-axis driving unit 32, and the Y-axis driving unit 33. The ROM 72 stores a control program PR1 for interpreting and executing a machining program PR2. The ROM 72 may be a rewritable semiconductor memory. The RAM 73 may rewritably store the machining program PR2 prepared by the operator. The machining program may be called an NC program. The CPU 71 executes the control program PR1 stored in the ROM 72 by using the RAM 73 as a work area to achieve the function of the NC apparatus 70.

The operating unit 80 includes an input part 81 and a display part 82 functioning as a user interface of the NC apparatus 70. The input part 81 may include a key and a touch panel that accepts an operator's input. The display part 82 may be a display showing various settings representing the operator's inputs and various information related to the lathe 1. The operator can store the machining program PR2 in the RAM 73 through the operating unit 80 or an external computer (not shown).

The NC apparatus 70 controls the positional relationship of the spindle 11 and the tool post 30 by the driving units (18, 23, 31) to form the true-circular eccentric part W1*p* (FIG. 3) on the workpiece W1 with the cutting tool for use as the tool TO1. The tool post 30 is an example of the moving object. The X-axis direction in FIG. 3 is an example of the moving direction D1 perpendicular to the spindle axis AX0. The NC apparatus 70 and the tool post driving unit 31 correspond to the control unit U1 for driving the moving object in the moving direction D1. In FIG. 3 and others, the spindle 11 gripping the workpiece W1 may be the front spindle 16 or the back spindle 21. The spindle axis AX0 may be then the spindle axis AX1 or the spindle axis AX2. The NC apparatus 70 and the driving units (18, 23, 31) move at least one of the moving objects including the spindle 11 and the tool post 30 in the moving direction D1 to perform the true-circular machining of the eccentric radius (rc) around the eccentric center position (Pc) in the moving direction D1 as the spindle 11 rotates.

The eccentric part W1*p* in FIG. 3 is the shape of a true circle of the eccentric radius (rc) around the eccentric center position (Pc) deviated from the spindle axis AX0 in the X-axis direction by a distance of an eccentric amount (Le). The eccentric center position (Pc) is on the eccentric axis AX3. FIG. 3 shows the initial position (Po) of the cutting edge TOt in contact with the workpiece W1, the first machining end point (Pa) on the eccentric radius (rc) at the first phase of the workpiece W1 around the spindle axis AX0, and the second machining end point (Pb) on the eccentric radius (rc) at the reverse phase different from the first phase by 180 degrees, all along the X-axis. At the start timing T1 of the true-circular eccentric machining, the cutting edge TOt is on the outer periphery of the workpiece W1. At the end timing T2, the cutting edge TOt is on the circumference passing through the machining end points (Pa, Pb) around the eccentric center position (Pc).

Figure 4:
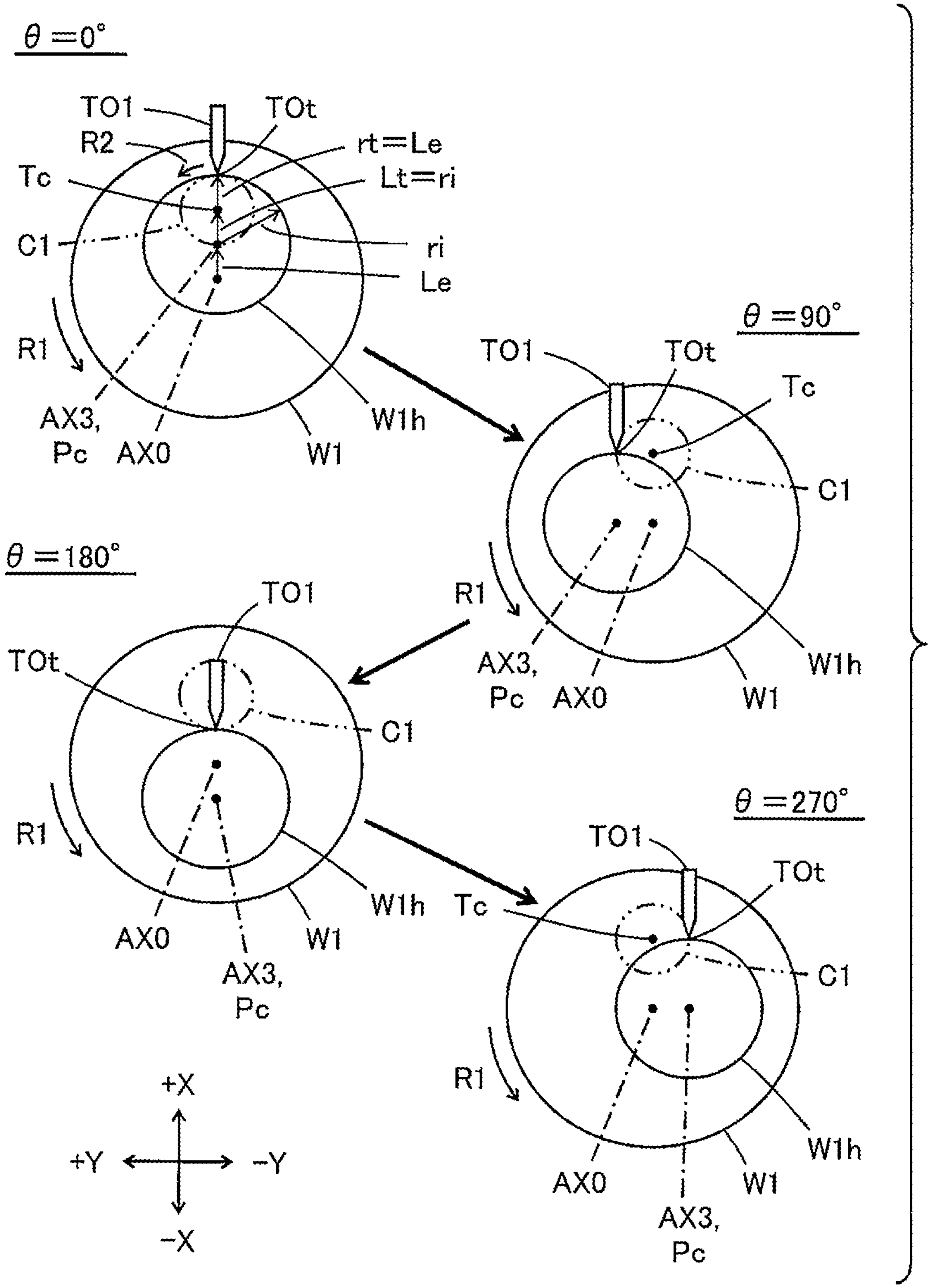
FIG. 4 schematically shows a motion of a tool on an X-Y plane as a workpiece rotates.

An exemplary moving position of the cutting edge TOt around the eccentric center position (Pc) is being described. FIG. 4 schematically shows the motion of the cutting edge TOt moving on the circumference of a half-finished eccentric part W1*h* on the X-Y plane containing the eccentric center position (Pc) as the workpiece W1 rotates. The cutting edge TOt of the tool TO1 at the C-axis angle θ of zero degree corresponding to the initial phase may be in the position of the largest X-coordinate (a coordinate on the X-axis). The direction that the X-coordinate becomes larger on the X-axis may be a +X direction while the direction that the X-coordinate becomes smaller on the X-axis may be a −X direction. The direction that the Y-coordinate becomes larger on the Y-axis may be a +Y direction while the direction that the Y-coordinate becomes smaller on the Y-axis may be a −Y direction.

At the C-axis angle θ of zero degree, the cutting edge TOt of the tool TO1 on the X-Y plane may have an X-coordinate indicating the eccentric radius (ri) of the half-finished eccentric part W1*h* on the X-axis plus the eccentric amount (Le). At the C-axis angle θ of 180 degrees corresponding to the reverse phase different from the initial phase by 180 degrees, the cutting edge TOt of the tool TO1 on the X-Y plane may have an X-coordinate indicating the eccentric radius (ri) of the half-finished eccentric part W1*h* on the X-axis minus the eccentric amount (Le). FIG. 4 shows that the cutting edge TOt is on the side of the +X direction with respect to the spindle axis AX0 at the C-axis angle θ of 180 degrees. The cutting edge TOt may be on the side of the −X direction with respect to the spindle axis AX0 at the C-axis angle θ of 180 degrees.

While the workpiece W1 makes a single rotation in a rotation direction R1 around the spindle axis AX0, the cutting edge TOt may make a single rotation in a rotation direction R2 along the circumference of an imaginary circle C1 having a diameter of a line segment connecting the zero degree position at the angle θ of zero degree and the 180 degrees position at the angle θ of 180 degrees. The concept of the imaginary circle C1 may be included in the concept of an imaginary arc. The concept of the circumference of the imaginary circle C1 may be included in the concept of the circumference of the imaginary arc. The center of the imaginary circle C1, which may be called an arc center (Tc), has an X-coordinate (Lt) corresponding to the eccentric radius (ri) of the half-finished eccentric part W1*h*. The radius of the imaginary circle C1, which may be called an arc radius (rt), equals the eccentric amount (Le) of the eccentric center position (Pc) from the spindle axis AX0. As shown in FIG. 4, when the cutting edge TOt moves along the circumference of the imaginary circle C1 while the C-axis angle θ changes from 0° to 90°, 180°, and 270° and returns to 0°, the circumference of the half-finished eccentric part W1*h* is formed on the X-Y plane containing the eccentric center position (Pc).

Figure 11:
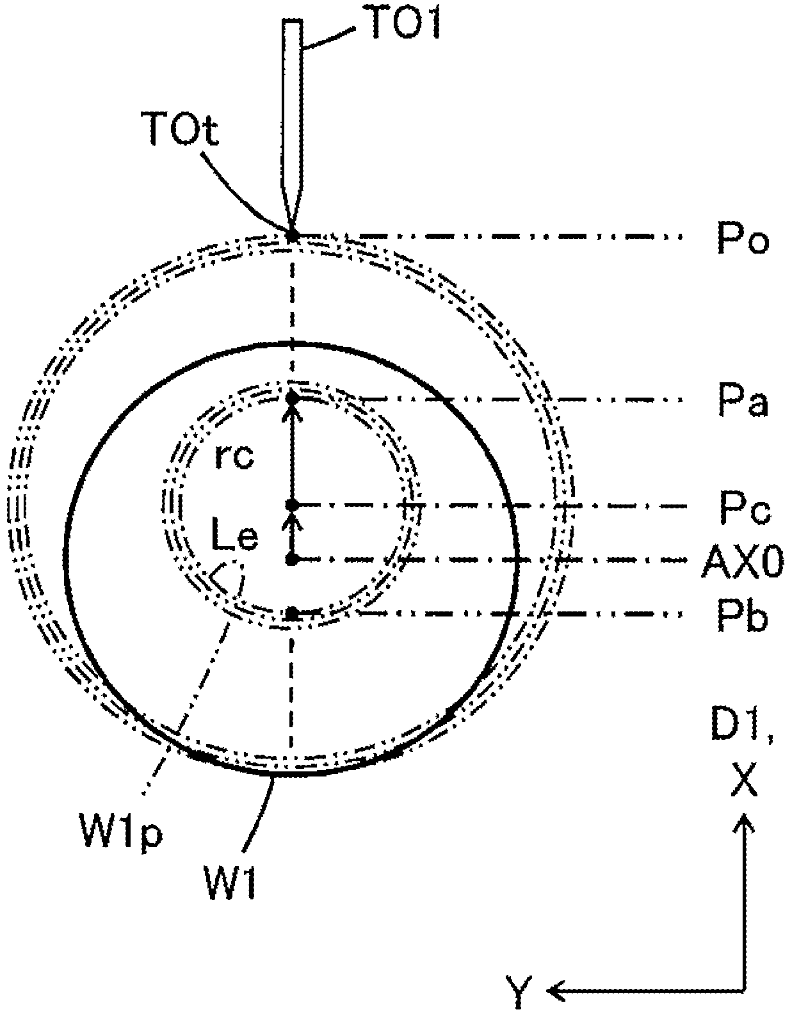
FIG. 11 is a comparative example of the cutting edge path.

As shown in FIG. 11, when the cutting edge TOt moves on the circumference of the finished eccentric part W1*p* around the eccentric center position (Pc) to cut the workpiece W1 rotating around the spindle axis AX0, the cutting edge TOt repeats a contact and separation with the workpiece W1 at an initial stage of the true-circular eccentric machining. FIG. 11 schematically shows a comparative example of a cutting edge path on the X-Y plane perpendicular to the spindle axis AX0. The cutting edge path means a path on the X-Y plane of the cutting edge TOt relatively rotates with respect to the workpiece W1 though the cutting edge TOt does not actually rotate. The cutting edge path shown in FIG. 5 and FIG. 6 has the same meaning as that in FIG. 11. The cutting edge TOt of the tool TO1 attached to the tool post 30 as an example of the moving object moves in the X-axis direction as an example of the moving direction D1. As shown in FIG. 11, when the eccentric center position (Pc) is between the spindle axis AX0 and the cutting edge TOt at the initial phase of the workpiece W1, the initial position (Po) of the cutting edge TOt is separate from the workpiece W1. When part of the cutting edge path on the circumference around the eccentric center position (Pc) on the X-Y plane perpendicular to the spindle axis AX0 is in a position outside the workpiece W1, the cutting edge TOt repeats the contact and separation with the workpiece W1 as the workpiece W1 rotates around the spindle axis AX0. Such intermittent cutting increases a risk of damage to the tool TO1. Variation in the eccentric radius of the cutting edge path for each single rotation of the spindle causes an occurrence of a step on the true-circular shape at the initial phase that the eccentric radius varies.

Desired is to improve the accuracy of the true-circular eccentric machining without an occurrence of intermittent cutting. The lathe 1 of the embodiment achieves the purpose by varying the intermediate eccentric center position (Pi) for each divided rotation angle (E) smaller than a single rotation of the spindle 11 or a single rotation of the workpiece W1.

(3) TRUE-CIRCULAR ECCENTRIC MACHINING DEVIATED FROM SPINDLE AXIS

FIG. 5 schematically shows the spiral cutting edge path varying the intermediate eccentric center position (Pi) in true-circular eccentric machining. FIG. 6 schematically shows the spiral cutting edge path around the eccentric center position (Pc) in a final machining allowance J. The lower drawings in FIG. 5 and FIG. 6 respectively show a relation between the eccentric amount (L) and the eccentric radius (r) with respect to time T from the start timing T1 to the end timing T2. The horizontal axis represents the time T. The left vertical axis represents the eccentric amount (L), which is the distance from the spindle axis AX0 to the intermediate eccentric center position (Pi). The right vertical axis represents the eccentric radius (ri) around the intermediate eccentric center position (Pi). The cutting tool edge TOt shown in FIG. 5 and FIG. 6 moves in the X-axis direction as an example of the moving direction D1. The example shown in FIG. 5 is being described.

The NC apparatus 70 determines the spiral cutting edge path that avoids an occurrence of intermittent cutting according to the initial position (Po), the final eccentric center position (Pc), and the final eccentric radius (rc) upon receipt of the initial position (Po) corresponding to the position of the cutting edge TOt in contact with the workpiece W1. As shown in the lower drawing in FIG. 5, the NC apparatus 70 increases the eccentric amount (L) and decreases the eccentric radius (r) as time elapses since the start timing T1 to thereby keep the cutting edge TOt in contact with the workpiece W1. The eccentric amount (L) becomes larger as the time T elapses while the eccentric radius (r) becomes smaller as the time T elapses during the period from the start timing T1 to the end timing T2. When the rotation speed (rev/min) of the workpiece W1 is constant, the eccentric amount (L) and the eccentric radius (r) can be calculated by the following formula in which (T1) represents the time T of the start timing T1, (T2) represents the time T of the end timing T2, and (ro) represents the radius of the workpiece W1 at the start timing T1.

$$L = Le \times (T - T1)/(T2 - T1) \tag{1}$$

$$r = ro - \{(ro - rc) \times (T - T1)/(T2 - T1)\} \tag{2}$$

The rotation speed (rev/min) may be called the number of rotations.

The NC apparatus 70 calculates the eccentric amount (L) and the eccentric radius (r) for each divided rotation angle (E) smaller than a single rotation of the spindle 11 within a range that the moving speed of the cutting edge TOt in the X-axis direction does not exceed the predetermined maximum feed speed (F) (FIG. 7). Such calculation can determine the intermediate eccentric center position (Pi) in the X-axis direction and the intermediate eccentric radius (ri) around the intermediate eccentric center position (Pi) to keep the cutting edge TOt in contact with the workpiece W1. The NC apparatus 70 gives a command to the tool post driving unit 31 to move the tool post in the X-axis direction as the spindle 11 rotates, thereby allowing the circular machining of the eccentric radius (ri) around the eccentric center position (Pi) for each divided rotation angle (E) to be performed on the workpiece W1. In response to the command, the tool post driving unit 31 moves the tool post 30 in the X-axis direction as the spindle 11 rotates. The circular machining of the eccentric radius (ri) around the eccentric center position (Pi) for each divided rotation angle (E) is thereby performed on the workpiece W1.

As shown by a two-dot chain line in FIG. 5, the spiral moving path keeping the cutting edge TOt in contact with the workpiece W1 is formed without an occurrence of intermittent cutting. Furthermore, variation in the eccentric amount (L) and the eccentric radius (r) happens for each divided rotation angle (E) smaller than a single rotation of the spindle 11, which suppresses an occurrence of a step on the true-circular shape which is likely formed at a phase that the eccentric radius (r) varies for each single rotation of the spindle. A smaller divided rotation angle (E) may increase the accuracy of the eccentric machining of a true circular shape as far as the movement of the tool post 30 in the moving direction D1 follows the command. For example, the divided rotation angle (E) may be 180 degrees or less, 90 degrees or less, and 45 degrees or less according to the following capability of movement of the tool post 30. The operating unit 80 of the lathe 1 shown in FIG. 2 may accept the setting of the divided rotation angle (E) within a recommended range (1 to 30 degrees, for example) considering the following capability of movement of the tool post 30.

The cutting edge path in FIG. 5 shows different machining allowances of the workpiece W1 for the phases of the spindle 11 until immediately before the finished eccentric part W1*p* is formed. Higher rotation speed of the spindle 11 decreases the circularity of the finished eccentric part W1*p*. As shown in FIG. 6, the moving path of the cutting edge TOt may be determined to make the machining allowances constant regardless of the spindle phases from the intermediate eccentric radius (rj) to the final eccentric radius (rc).

The NC apparatus 70 determines the cutting edge path in cutting toward the final eccentric center position (Pc) in a similar manner described above until the true-circular machining of the intermediate eccentric radius (rj) is complete on the workpiece W1 The intermediate eccentric radius (rj) equals the final eccentric radius (rc) around the eccentric center position (Pc) plus the final machining allowance J. The intermediate eccentric radius (rj) allows the cutting edge TOt to be kept in contact with the workpiece W1 in the true-circular machining around the final eccentric center position (Pc). The final machining allowance J is set within a range keeping the cutting edge TOt in contact with the workpiece W1 in the true-circular machining around the final eccentric center position (Pc). The NC apparatus 70 determines the spiral cutting edge path that can avoid an occurrence of intermittent cutting until the true-circular machining of the intermediate eccentric radius (rj) is complete. The NC apparatus 70 determines the spiral cutting edge path according to the initial position (Po), the final eccentric center position (Pc), and the intermediate eccentric radius (rj) which is on the way from the initial position (Po) to the final eccentric radius (rc). As shown in the lower drawing of FIG. 6, the NC apparatus 70 increases the eccentric amount (L) and decreases the eccentric radius (r) as the time elapses from the start timing T1 to keep the cutting edge TOt in contact with the workpiece W1. An arrival timing T3 at the intermediate eccentric radius (rj) may be represented by T3. When the rotation speed (rev/min) of the workpiece W1 is constant, the eccentric amount (L) and the eccentric radius (r) from the start timing T1 to the arrival timing T3 can be calculated by:

$$L = Le \times (T - T1)/(T3 - T1) \tag{3}$$

$$r = ro - \{(ro - rj) \times (T - T1)/(T3 - T1)\} \tag{4}$$

The NC apparatus 70 calculates the eccentric amount (L) and the eccentric radius (r) for each divided rotation angle (E) smaller than a single rotation of the spindle 11 within a range that the moving speed of the cutting edge TOt in the X-axis direction does not exceed the predetermined maximum speed (F). Such calculation can determine the intermediate eccentric center position (Pi) in the X-axis direction and the intermediate eccentric radius (ri) around the intermediate eccentric center position (Pi) to keep the cutting edge TOt to be in contact with the workpiece W1. The NC apparatus 70 gives a command to the tool post driving unit 31 to move the tool post in the X-axis direction as the spindle 11 rotates, thus allowing the circular machining of the eccentric radius (ri) around the eccentric center position (Pi) for each divided rotation angle (E) is performed on the workpiece W1. Accordingly, the NC apparatus 70 and the tool post driving unit 31 move the tool post 30 in the X-axis direction to perform the circular machining of the eccentric radius (ri) around the eccentric center position (Pi) for each divided rotation angle (E) on the workpiece W1 until the true-circular machining of the eccentric radius (rj) from the initial position (Po) is complete on the workpiece W1.

In the final machining allowance J, the NC apparatus 70 determines the spiral cutting edge path according to the final eccentric center position (Pc), the intermediate eccentric radius (rj) around the eccentric center position (Pc), and the final eccentric radius (rc). As shown in the lower drawing of FIG. 6, the NC apparatus 70 decreases the eccentric radius (r) as the time elapses from the arrival timing T3 while keeping the eccentric amount (L) at the final eccentric amount (Le). When the rotation speed (rev/min) of the workpiece W1 is constant, the eccentric radius (r) from the arrival timing T3 to the end timing T2 can be calculated by:

$$r = rj - \{(rj - rc) \times (T - T3)/(T2 - T3)\} \quad (5)$$

The NC apparatus 70 calculates the eccentric radius (r) for each divided rotation angle (E) smaller than a single rotation of the spindle 11 within a range that the moving speed of the cutting edge TOt in the X-axis direction does not exceed the predetermined maximum speed (F). Such calculation can determine the intermediate eccentric radius (ri) around the final eccentric center position (Pc) to keep the cutting edge TOt in contact with the workpiece W1. The NC apparatus 70 gives a command to the tool post driving unit 31 to move the tool post in the X-axis direction as the spindle 11 rotates, thereby allowing the circular machining of the eccentric radius (ri) around the eccentric center position (Pc) for each divided rotation angle (E) is performed on the workpiece W1. In response to the command, the tool post driving unit 31 moves the tool post 30 in the X-axis direction. The circular machining of the eccentric radius (ri) around the final eccentric center position (Pc) for each divided rotation angle (E) is thereby performed on the workpiece W1. Thus, the NC apparatus 70 and the tool post driving unit 31 moves the tool post 30 in the X-axis direction within the maximum feed speed (F) to complete the true-circular machining of the eccentric radius (rc) around the eccentric center position (Pc) on the workpiece W1 with the eccentric radius (rj) as a start point.

As shown by a two-dot chain line in FIG. 6, the spiral moving path keeping the cutting edge TOt in contact with the workpiece W1 is formed. Variation in the eccentric amount (L) and the eccentric radius (r) happens for each divided rotation angle (E) smaller than a single rotation of the spindle 11, which suppresses an occurrence of a step on the true-circular shape which is likely formed when the eccentric radius (r) varies for each single rotation of the spindle. Constant allowances from the intermediate eccentric radius (rj) through the final eccentric radius (rc) regardless of the spindle phases can increase the circularity of the finished eccentric part W1*p*.

(4) EXAMPLE OF ECCENTRIC MACHINING PROCESS

FIG. 7 shows an eccentric machining process varying the eccentric center position (Pi) and the eccentric radius (ri) until reaching the final machining allowance J. The NC apparatus 70 shown in FIG. 2 reads an eccentric machining command CM1 from the machining program PR2 to start the eccentric machining process. FIG. 7 shows the eccentric machining command CM1 specified in the machining program PR2. The moving direction D1 of the moving object (the tool post 30) may be the X-axis direction.

The eccentric machining command CM1 shown in FIG. 7 has a format of "G* A B (E) (J) F S** P*" in which the words (E) and (J) can be omitted. The argument "" following "G" represents the number of the eccentric machining command CM1. The argument "" following "A" represents a coordinate Xa (in mm) of the first machining end point (Pa) on the eccentric radius (rc) at the initial phase (θ=0°) of the workpiece W1 around the spindle axis AX0. The argument "" following "B" represents a coordinate Xb (in-mm) of the second machining end point (Pb) on the eccentric radius (rc) at the reverse phase (θ=180°) different from the initial phase by 180 degrees. The coordinate Xb is a positive value when the position of the spindle axis AX0 is between the first machining end point (Pa) and the second machining end point (Pb) on the X-Y plane. The coordinate Xb is a negative value when the second machining end point (Pb) is between the position of the spindle axis AX0** and the first machining end point (Pa). The argument "*" following "E" represents a divided rotation angle (in deg). The divided rotation angle (E) may have a recommended range (15 to 30 degrees, for example) considering the following capability of movement of the tool post 30. When the "E" is not specified, the divided rotation angle (E) may be set to a default value (20 degrees, for example). The argument "" following "J" represents the final machining allowance (in mm). The final machining allowance J may be zero or more and the distance from the initial position (Po) to the first machining end point (Pa) at most. When the "J" is not specified, the final machining allowance J may be zero. The argument "" following "F" represents the maximum feed speed (mm/rev) of the tool post 30 in the X-axis direction. The argument "" following "S" represents the rotation speed (rev/min) of the spindle 11**. The argument "*" following "P" may be two representing the cutting toward the eccentric center position (Pc) or three representing the separation from the eccentric center position (Pc). When the moving direction D1 of the tool post 30 is Y-axis direction, each coordinate specified in the eccentric machining command CM1 is a Y-axis coordinate. Though not shown, the moving direction D1 of the tool post 30 may be deviated from both of the X-axis direction and the Y-axis direction on the X-Y plane.

The eccentric machining process shown in FIG. 7 represents an eccentric machining method including a moving position determining method. The eccentric machining method includes steps (A1), (A2), and (A3) described below:

(A1) A first step ST1 (corresponding to Step S102) determining the intermediate eccentric center position (Pi) and the intermediate eccentric radius (ri) within a range that the moving speed of the tool post 30 in the moving direction D1 does not exceed the predetermined maximum speed (F) according to the initial position (Po) of the cutting edge TOt, the final eccentric center position (Pc), and the final eccentric radius (rc).

(A2) a second step ST2 (corresponding to Steps S104 to S116) determining the moving position of the tool post 30 in the moving direction D1 as the spindle 11 rotates to perform the circular machining of the eccentric radius (ri) around the eccentric center position (Pi or Pc) for each divided rotation angle (E) on the workpiece W1.

(A3) a third step ST3 (corresponding to Step S118) moving the tool post 30 as the spindle 11 rotates according to the moving position of the cutting edge TOt.

The "Step" preceding the step number is being omitted hereinbelow.

Upon start of the eccentric machining process, the NC apparatus 70 acquires the initial position (Po) of the cutting edge TOt in the X-axis direction and the arguments of the eccentric machining command CM1 (S102). The initial position (Po) is the position of the cutting edge TOt immediately before executing the eccentric machining command CM1. Then the NC apparatus 70 calculates a coordinate Xc (in mm) of the final eccentric center position (Pc) and the eccentric radius (rc) (in mm) around the final eccentric center position (Pc) according to the coordinate Xa of the first machining end point (Pa) and the coordinate Xb of the second machining end point (Pb) (S104). The coordinate Xc and the eccentric radius (rc) can be calculated by:

$$Xc=(Xa-Xb)/2 \tag{6}$$

$$rc=(Xa+Xb)/2 \tag{7}$$

Figure 12:
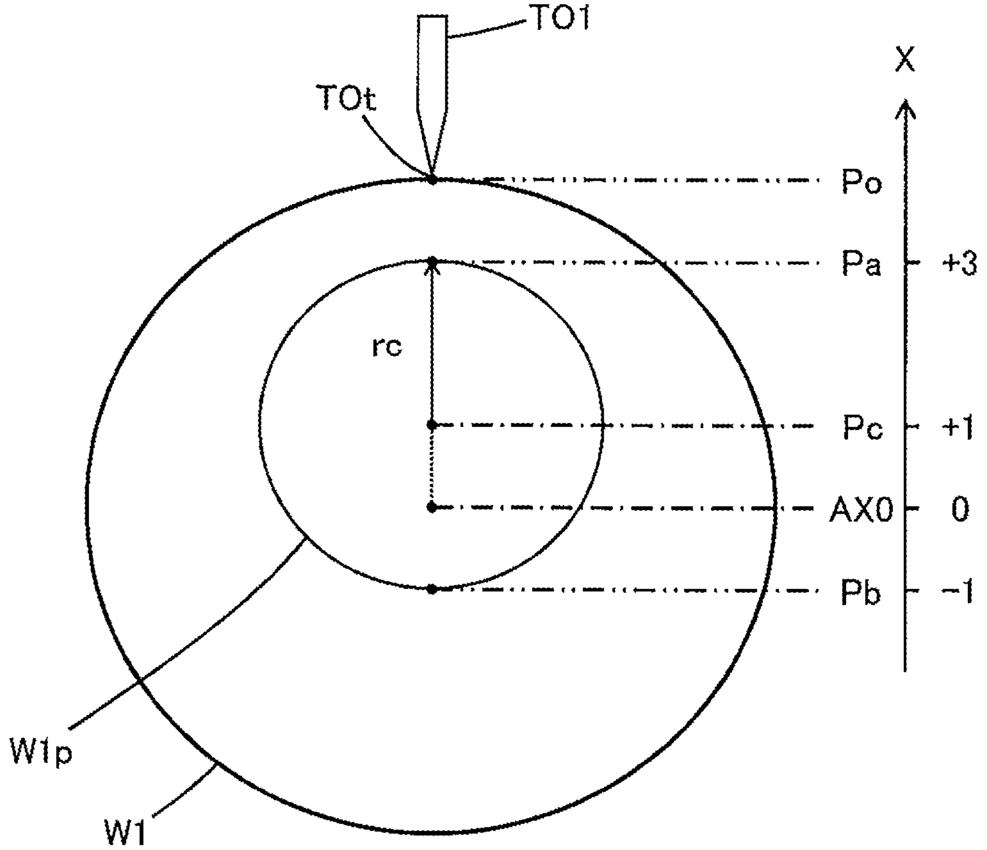
FIG. 12 shows a calculation example of a coordinate Xc of a final eccentric center position (Pc) and an eccentric radius (rc) around the eccentric center position (Pc)

Referring to FIG. 12, the calculation of the coordinate Xc and the eccentric radius (rc) around the eccentric center position (Pc) according to the coordinate Xa of the first machining end point (Pa) and the coordinate Xb of the second machining end point (Pb) is being described. The X-coordinate of the spindle axis AX0 may be zero. When the X-coordinate of the first machining end point (Pa) equals "+3", the coordinate Xa corresponding to the argument "" following "A" is "+3". When the X-coordinate of the second machining end point (Pb) equals "−1", the coordinate Xb corresponding to the argument "" following "B" is "+1". Accordingly, the X-coordinate of the final eccentric center position (Pc) can be calculated by:

$$Xc=(Xa-Xb)/2=(3-1)/2=+1$$

The eccentric radius (rc) can be calculated by:

$$rc=(Xa+Xb)/2=(3+1)/2=2$$

The NC apparatus 70 then calculates the intermediate eccentric radius (rj) on the way from the initial position (Po) to the eccentric radius (rc) around the final eccentric center position (Pc) (S106). The eccentric radius (rj) in the movement cutting toward the eccentric center position (Pc) can be calculated by:

$$rj=rc+J \tag{8}$$

The eccentric radius (rj) in the movement separating from the eccentric center position (Pc) can be calculated by:

$$rj=rc-J \tag{9}$$

An example in the movement cutting toward the eccentric center position (Pc) is being described.

The NC apparatus 70 then calculates the number of rotations (N1) (N1>0) of the spindle 11 required to complete the true-circular machining on the workpiece W1 around the eccentric center position (Pc) according to the initial position (Po) whose coordinate may be Xo, the coordinate Xa of the first machining end point (Pa), the coordinate Xb of the second machining end point (Pb), and the maximum feed speed (F) (S108). The eccentric center position (Pc) is the middle point between the first machining end point (Pa) and the second machining end point (Pb). When Xa>Xb, the allowance of the workpiece W1 is larger at the reverse phase (θ=180°) than at the initial phase (θ=0°). When Xa<Xb, the allowance of the workpiece W1 is larger at the initial phase (θ=0°) than at the reverse phase (θ=180°). The number of rotations (N1) in the movement cutting toward the workpiece W1 can be calculated by:

When Xa>Xb, $$N1=(Xo-Xb-J)/F \tag{10}$$

When Xa<Xb, $$N1=(Xo-Xa-J)/F \tag{11}$$

The NC apparatus 70 determines the intermediate eccentric center position (Pi) and the intermediate eccentric radius (ri) for each divided rotation angle (E) while the spindle 11 rotates around the spindle axis AX0 by the number of rotations (N1) from the start timing T1 (S110). The arrival timing T3 shown in FIG. 6 is the moment at which the number of rotations (N1) is reached. Every time the spindle 11 makes a single rotation from the start timing T1 to the arrival timing T3, the eccentric amount (L) increases by Le/N1 and the eccentric radius (r) decreases by (ro−rj)/N1. The eccentric amount (L) and the eccentric radius (r) from the start timing T1 to the arrival timing T3 can be calculated by:

$$L=Le\times\{N+(\theta/360)\}/N1 \tag{12}$$

$$r=ro-[(ro-rj)\times\{N+(\theta/360)\}/N1] \tag{13}$$

where "N" represents the number of rotations of the spindle 11 from the start timing T and "θ" (in deg) represents the spindle phase.

The circular machining of the eccentric radius (ri) around the eccentric center position (Pi) for each divided rotation angle (E) is thereby performed on the workpiece W1 until the true-circular machining of the eccentric radius (rj) keeping the cutting edge TOt in contact with the workpiece W1 is performed on the workpiece W1. The eccentric radius (rj) is on the way from the initial position (Po) to the eccentric radius (rc) around the eccentric center position (Pc).

The NC apparatus 70 then calculates the number of rotations (N2) (N2≥0) of the spindle 11 required to complete the true-circular machining from the eccentric radius (rj) up to the final eccentric radius (rc) (S112). The true-circular machining from the eccentric radius (rj) up to the eccentric radius (rc) is done around the final eccentric center position (Pc). The number of rotations (N2) in the movement cutting toward the workpiece W1 can be calculated by:

$$N2=(rj-rc)/F \tag{14}$$

The NC apparatus 70 then determines the intermediate eccentric radius (ri) for each divided rotation angle (E) while the spindle 11 rotates around the spindle axis AX0 by the number of rotations (N2) from the arrival timing T3 (S114). The end timing T2 shown in FIG. 6 is the moment at which the number of rotations (N2) is reached. The eccentric amount (L) is maintained at the amount (Le) from the arrival timing T3 to the end timing T2. Every time the spindle 11 makes a single rotation, the eccentric radius (r) decreases by (rj−rc)/N2. The eccentric radius (ri) from the arrival timing T3 to the end timing T2 can be calculated by:

$$ri=rj-\{(rj-rc)\times\{N-N1+(\theta/360)\}/N2\} \tag{15}$$

where "N" represents the number of rotations of the spindle 11 from the start timing T1 and "θ" (in deg) represents the spindle phase.

The true-circular machining of the eccentric radius (rc) around the eccentric center position (Pc) with the eccentric radius (rj) as the start point is thereby performed on the workpiece W1.

The NC apparatus 70 then determines the moving position of the cutting edge TOt in the X-axis direction as the spindle 11 rotates according to the eccentric center position (Pi or Pc) and the eccentric radius (ri) for each divided rotation angle (E) (S116). The moving position of the cutting edge TOt has an additional variation according to the phase θ of the spindle 11 to form the spiral moving path shown in FIG. 5 and FIG. 6.

The NC apparatus 70 finally gives a command to the tool post moving unit 31 to move the tool post 30 in the X-axis direction according to the moving position of the cutting edge TOt (S118). The tool post driving unit 31 accordingly moves the tool post 30 in the X-axis direction as the spindle 11 rotates. The circular machining of the eccentric radius (ri) around the eccentric center position (Pi or Pc) for each divided rotation angle (E) is thereby performed on the workpiece W1.

As described above, the cutting edge TOt can be kept in contact with the workpiece W1 while the true-circular machining deviated from the spindle axis AX0 is performed, which prevents an occurrence of intermittent cutting. Variation in the eccentric amount (L) and the eccentric radius (r) occurs for each divided rotation angle (E) smaller than a single rotation of the spindle 11, which suppresses an occurrence of a step on the true-circular shape which is likely formed when the eccentric radius (r) varies for each single rotation of the spindle. The machining allowance can be constant from the intermediate eccentric radius (rj) to the final eccentric radius (rc) regardless of the spindle phases, which improves the circularity of the eccentric machining. The embodiment provides a machine tool capable of improving the accuracy of the true-circular eccentric machining while avoiding an occurrence of intermittent cutting.

As shown in FIG. 8, the NC apparatus 70 may automatically determine the final machining allowance J. FIG. 8 schematically shows the eccentric machining process including the allowance determining process. FIG. 8 is different from FIG. 7 in that S202 replaces S102 and that S204 is added between S104 and S106. The moving direction D1 of the tool post 30 may be the X-axis direction. Upon start of the eccentric machining process, the NC apparatus 70 acquires the initial position (Po) of the cutting edge TOt in the X-axis direction and the arguments of the eccentric machining command CM1 (S202). The eccentric machining command CM1 may not include the word "J". When the word "J" is specified, the NC apparatus 70 may perform the process shown in FIG. 7.

The NC apparatus 70 calculates the coordinate Xc (in mm) of the final eccentric center position (Pc) and the eccentric radius (rc) (in mm) around the eccentric center position (Pc) by using the formulas (6) and (7) described above (S104). The NC apparatus 70 then calculates the final allowance J according to the initial position (Po), the final eccentric center position (Pc) and the final eccentric radius (rc) (S204).

For example, when the coordinate Xa of the first machining end point (Pa) is larger than the coordinate Xb of the second machining end point (Pb) in the movement cutting toward the workpiece W1, the maximum final allowance J (Jmax) may be the value deducting the coordinate Xa of the first machining end point (Pa) from the coordinate Xo of the initial position (Xo−Xa). The NC apparatus 70 may use the maximum allowance Jmax as the final allowance J. When the coordinate Xa of the first machining end point (Pa) is smaller than the coordinate Xb of the second machining end point (Pb), the maximum final allowance J (Jmax) may be the value deducting the coordinate Xb of the second machining end point (Pb) from the coordinate Xo of the initial position (Xo−Xb). The NC apparatus 70 may use the maximum allowance Jmax as the final allowance J. In either case, the cutting edge TOt is kept in contact with the workpiece W1 from the first position (Po) up to the intermediate eccentric radius (rj). The NC apparatus 70 may use a value larger than zero and smaller than the maximum allowance Jmax as the final allowance J. For example, the NC apparatus 70 may use the value multiplying the maximum allowance Jmax by an efficient k that may be larger than zero and smaller than one (0.1≤k≤0.9, for example).

The NC apparatus 70 then calculates the intermediate eccentric radius (rj) before reaching the eccentric radius (rc) around the final eccentric center position (Pc) according to the formulas (8) and (9) (S106). As described above, the NC apparatus 70 determines the eccentric radius (rj) that keeps the cutting edge TOt in contact with the workpiece W1 around the eccentric center position (Pc) according to the initial position (Po), the eccentric center position (Pc), and the eccentric radius (rc). The NC apparatus 70 then executes the S108 to S116 steps shown in FIG. 7 to determine the moving position of the cutting edge TOt in the X-axis direction as the spindle 11 rotates. The NC apparatus 70 finally gives the command to the tool post driving unit 31 to move the tool post 30 in the X-axis direction according to the moving position of the cutting edge TOt (S118).

The final machining allowance J can be automatically determined in S204, which conveniently eliminates the need of setting the final allowance J.

(5) EXAMPLE OF INPUT INTERFACE FOR MACHINING PROGRAM

The operating unit 80 shown in FIG. 2 has an input interface facilitating a command input of the machining program PR2. The input part 81 of the operating unit 80 has a plurality of keys including numerical keys of 0 to 9 and a decimal point, selection keys less than the number of alphabets, arrow keys, and an ALT key. Each numerical key allows a single operation of inputting 0 to 9 and a decimal point. Each selection key corresponding to a plurality of alphabets needs switching the alphabets to input a desired one.

Figure 10:
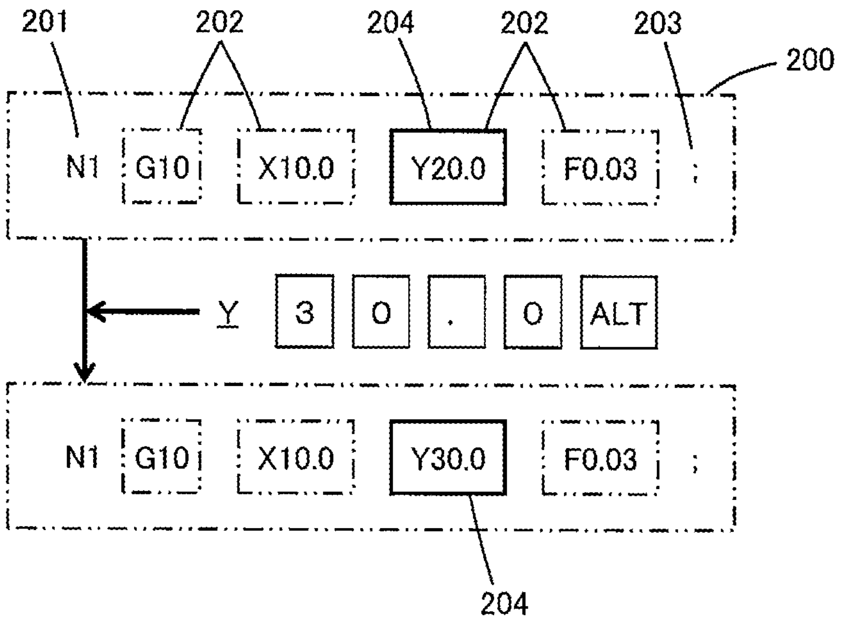
FIG. 10 is a comparative example of an input interface for the machining program.

FIG. 10 schematically shows a comparative example of the input interface for the machining program. The machining program has a single block 200 per line. Each block 200 contains a sequence number 201, one or more words 202, and EOB (End of Block) 203. The sequence number 201 may have a numerical serial number for identifying what number the block 200 is. Each word 202 consists of an alphabet representing an address and a numerical value representing a specified data. The EOB 203 represents the end of the block 200.

In a word editing mode to edit the word 202, the operating unit 80 accepts an editing operation for the word 202 on which a cursor 204 is on. The operating unit 80 accepts an alphabet, a numerical value, and then the ALT key to accordingly update the word 202 at the cursor position. For example, when the word 202 at the cursor position is "Y20.0", the operator necessarily inputs the alphabet "Y", the numerical value "30.0" and then the ALT key to update the word 202 to "Y30.0". Switching the alphabets and then entering the alphabet is troublesome especially when the operator wants to update only the numerical value.

Figure 9:
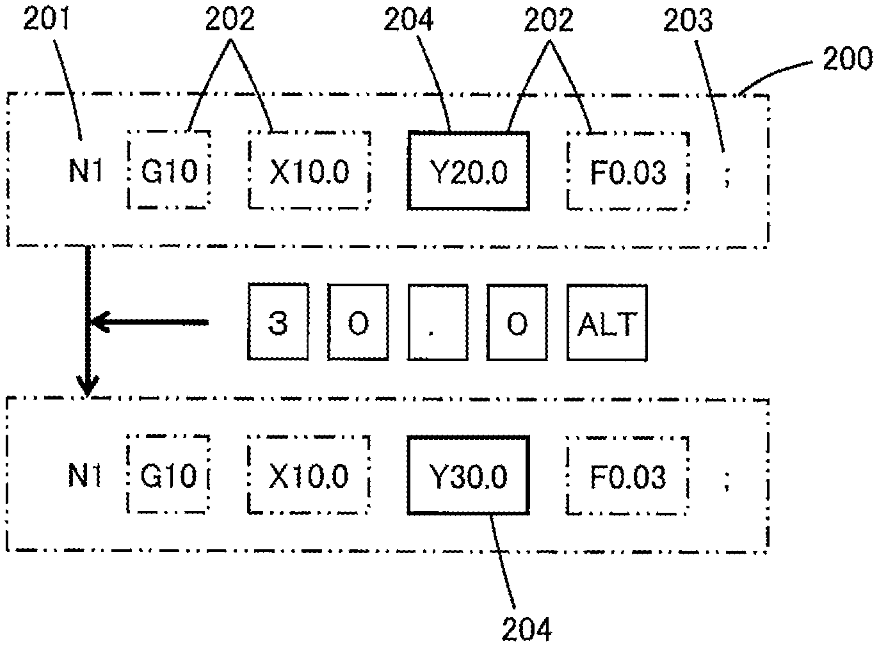
FIG. 9 shows an input interface for a machining program

FIG. 9 schematically shows an improved input interface. When the operator inputs only the numerical value in the word editing mode, the operating unit 80 updates only the data (the numerical value) with the address (the alphabet) keep maintained. Upon receipt of the numerical value and then the ALT key, the operating unit 80 changes only the data of the word 202 on which the cursor is on. For example, when the word 202 at the cursor position is "Y20.0", the operator necessarily inputs the numerical value "30.0" and then the ALT key to update the word 202 to "Y30.0". The operator may input the alphabet "Y," the numerical value "30.0" and then the ALT key to update the word 202 to "Y30.0

In the word editing mode, the operator can change the data (the numerical value) without a troublesome input of the address (the alphabet), The input interface shown in FIG. 9 facilitates the editing operation of the word 202. The function may be executed by the NC apparatus 70 shown in FIG. 2.

(6) MODIFIED EMBODIMENT

The invention may be applied in various embodiments. The machine tool to which the invention is applicable may not be limited to a lathe. The invention may be applied in a machining center, for example. The lathe 1 may be of a spindle-stationary type whose front spindle 16 does not move in the Z-axis direction. When the spindle 11 is movable in the moving direction D1, the control unit U1 may move the spindle 11 in the moving direction D1 or may move the spindle 11 along the tool post 30 in the moving direction D1. The rotation speed of the spindle 11 in eccentric machining may not be limited to constant in a unit of rev/mm. It may vary under speed constant control and others.

The eccentric machining process shown in FIG. 7 and FIG. 8 may be appropriately modified. For example, the calculating process (S112) may be performed immediately before S108 or S110. The S112 to S114 processes may be performed immediately before S108 or S110. At least part of the processes S102 to S116, S202, and S204 may be executed by an external computer, for example, or any apparatus external to the lathe 1.

The eccentric machining command CM1 may not be limited to the example described above. The eccentric machining command CM1 may include a word representing the final eccentric center position (Pc) and the final eccentric radius (rc) instead of the coordinates of the machining end points (Pa, Pb). The eccentric machining command CM1 may include a word representing the initial position (Po) of the cutting edge TOt.

(7) CONCLUSION

As described above, the invention can provide technology of the machine tool capable of facilitating the selection of the tool for vibration-cutting and the setting of the vibration cutting conditions. The technology only consisting of the elements of any independent claims can provide the function and the effect described above. The invention can be embodied in any configuration replacing the elements or changing the combination of the elements between the embodiments described above. The invention can be embodied in any configuration replacing the elements or changing the combination of the elements between the prior art and any of the embodiments described above. Such configurations are all included within the scope of the invention.

What is claimed is:

1. A machine tool comprising:
- a spindle rotating around a spindle axis along with a workpiece;
- a tool post to which a tool is attached, the tool having a cutting edge cutting the workpiece; and
- a control unit configured to move at least one moving object in a moving direction perpendicular to the spindle axis to perform a true-circular machining of an eccentric radius (rc) around an eccentric center position (Pc) in the moving direction as the spindle rotates, the moving object including the spindle and the tool post;
- wherein the control unit determines an intermediate center position (Pi) in the moving direction for each divided rotation angle (E) smaller than a single rotation of the spindle and an intermediate eccentric radius (ri) around the intermediate center position (Pi) according to an initial position (Po) of the cutting edge in contact with the workpiece in the moving direction, the eccentric center position (Pc), and the eccentric radius (rc) to keep the cutting edge in contact with the workpiece as the moving object moves in the moving direction within a predetermined maximum feed speed (F) until the true-circular machining around the eccentric center position (Pc) is complete on the workpiece, and the control unit moves the moving object in the moving direction as the spindle rotates to perform a cutting of the intermediate eccentric radius (ri) around the intermediate eccentric center position (Pi) for said each divided rotation angle (E) on the workpiece.

2. The machine tool of claim 1, wherein the control unit moves the moving object in the moving direction to perform the cutting of the intermediate eccentric radius (ri) around the intermediate eccentric center position (Pi) for said each divided rotation angle (E) on the workpiece until the true-circular machining of an intermediate eccentric radius (rj) around the eccentric center position (Pc) is complete on the workpiece, the intermediate eccentric radius (rj) being on the way from the initial position (Po) to the eccentric radius (rc) to keep the cutting edge in contact with the workpiece, and the control unit moves the moving object in the moving direction within the maximum feed speed (F) to perform the true-circular machining of the eccentric radius (rc) around the eccentric center position (Pc) on the workpiece with the eccentric radius (rj) as a start point.

3. The machine tool of claim 2, wherein the control unit determines the eccentric radius (rj) around the eccentric center position (Pc) according to the initial position (Po), the eccentric center position (Pc), and the eccentric radius (rc).

4. The machine tool of claim 1, wherein the control unit receives a command including a coordinate of a first machining end point (Pa) on the eccentric radius (rc) at an initial phase of the workpiece around the spindle axis, a coordinate of a second machining end point (Pb) on the eccentric radius (rc) at a reverse phase different from the initial phase by 180 degrees, and the maximum feed speed (F), the control unit calculates a number of rotations (N1) of the spindle required to complete the true-circular machining around the eccentric center position (Pc) on the workpiece according to the initial position (Po), the coordinate of the first machining end point (Pa), the coordinate of the second machining end point (Pb), and the maximum feed speed (F), the eccentric center position (Pc) being a middle point between the first machining end point (Pa) and the second machining end point (Pb), and the control unit determines the eccentric center position (Pi) and the eccentric radius (ri) for said each divided rotation angle (E) at the phase of the workpiece around the spindle axis according to the initial position (Po), the eccentric center position (Pc), the eccentric radius (rc), and the number of rotations (N1), the eccentric radius (rc) being half a distance between the first machining end point (Pa) and the second machining end point (Pb).

5. The machine tool of claim 2, wherein the control unit receives a command including a coordinate of a first machining end point (Pa) on the eccentric radius (rc) at an initial phase of the workpiece around the spindle axis, a coordinate of a second machining end point (Pb) on the eccentric radius (rc) at a reverse phase different from the initial phase by 180 degrees, and the maximum feed speed (F), the control unit calculates a number of rotations (N1) of the spindle required to complete the true-circular machining around the eccentric center position (Pc) on the workpiece according to the initial position (Po), the coordinate of the first machining end point (Pa), the coordinate of the second machining end point (Pb), and the maximum feed speed (F), the eccentric center position (Pc) being a middle point between the first machining end point (Pa) and the second machining end point (Pb), and the control unit determines the eccentric center position (Pi) and the eccentric radius (ri) for said each divided rotation angle (E) at the phase of the workpiece around the spindle axis according to the initial position (Po), the eccentric center position (Pc), the eccentric radius (rc), and the number of rotations (N1), the eccentric radius (rc) being half a distance between the first machining end point (Pa) and the second machining end point (Pb).

6. A moving position determining method for a machine tool provided with a spindle rotating around a spindle axis along with a workpiece and a tool post to which a tool having a cutting edge cutting the workpiece is attached, the method moving at least one moving object including the spindle and the tool post in a moving direction perpendicular to the spindle axis to perform a true-circular machining of an eccentric radius (rc) around an eccentric center position (Pc) in the moving direction as the spindle rotates, the method comprising:

a first step determining an intermediate center position (Pi) in the moving direction for each divided rotation angle (E) smaller than a single rotation of the spindle and an intermediate eccentric radius (ri) around the intermediate center position (Pi) according to an initial position (Po) of the cutting edge in contact with the workpiece in the moving direction, the eccentric center position (Pc), and the eccentric radius (rc) to keep the cutting edge in contact with the workpiece as the moving object moves in the moving direction within a predetermined maximum feed speed (F) until the true-circular machining around the eccentric center position (Pc) is complete on the workpiece, and a second step determining the moving position of the moving object in the moving direction as the spindle rotates to perform a cutting of the intermediate eccentric radius (ri) around the intermediate eccentric center position (Pi) for said each divided rotation angle (E) on the workpiece.

* * * * *